July 19, 1960  T. G. ANKENY ET AL  2,945,291
FRICTION MATERIAL

Filed Nov. 28, 1958  2 Sheets-Sheet 1

INVENTOR.
Thomas G. Ankeny
John W. Arnett
BY
THEIR ATTORNEY

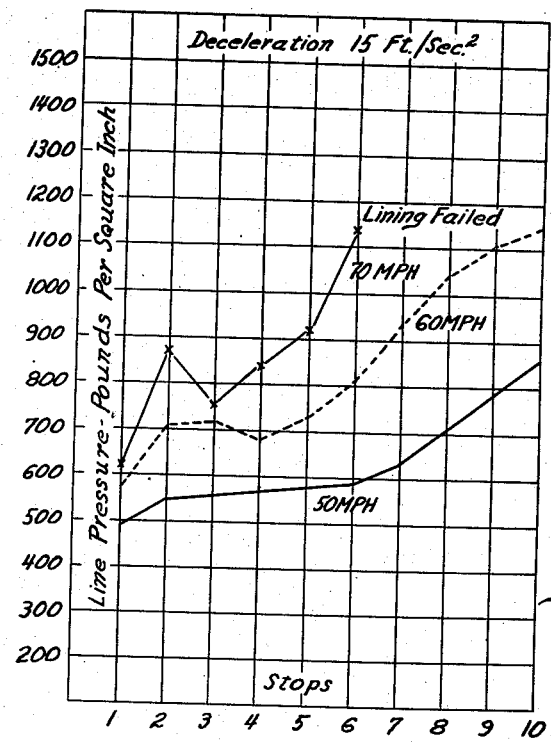
_Fig. 4_
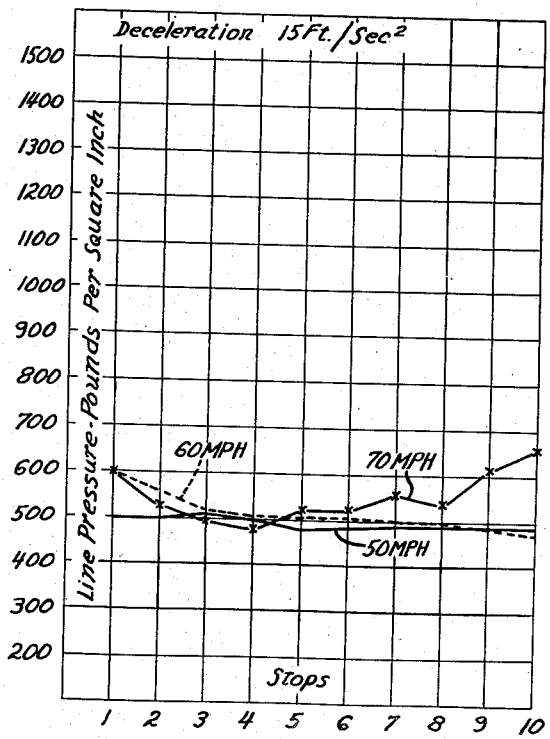
_Fig. 5_

United States Patent Office 2,945,291
Patented July 19, 1960

2,945,291
FRICTIONAL MATERIAL

Thomas G. Ankeny, Birmingham, Mich., and John W. Arnett, Dayton, Ohio, assignors to General Motors Corporation, Detroit, Mich., a corporation of Delaware Filed Nov. 28, 1958, Ser. No. 776,973

8 Claims. (Cl. 29—182.5)

This invention relates to friction materials and is particularly concerned with ferrous friction members for use as clutches, brakes and the like.

This application is a continuation-in-part of application S.N. 540,842, filed October 17, 1955, now abandoned.

An object of the invention is to provide a ferrous friction facing consisting essentially of iron, graphite and molybdenum disulfide.

In carrying out the above object, it is a further object of the invention to form the friction member from a sintered mixture consisting essentially of iron powder, graphite and molybdenum disulfide wherein the graphite makes up between one-fifth and one-fourth of the weight of the member.

A still further object of the invention is to provide a ferrous friction member wherein the member consists essentially of graphite ranging between 20% and 25% by weight, molybdenum disulfide between 2% and 6% by weight with iron making up substantially all the remainder.

Another object of the invention is to provide the ferrous friction element as heretofore disclosed wherein the element is coextensively bonded to a strong metal supporting member for facilitating mounting of the friction element.

More specifically, it is an object of the invention to provide a sintered ferrous friction facing consisting essentially of 20% graphite, 5% molybdenum disulfide with substantailly all the remainder being iron with or without small additions of modifying materials wherein said percentages are expressed on a weight basis.

Further objects and advantages of the present invention will be apparent from the following description, reference being had to the accompanying drawings wherein preferred embodiments of the present invention are clearly shown.

In the drawings:

Figures 4 and 5 are charts showing a comparison between conventional and metallic brake linings in deceleration tests.

Figure 1:
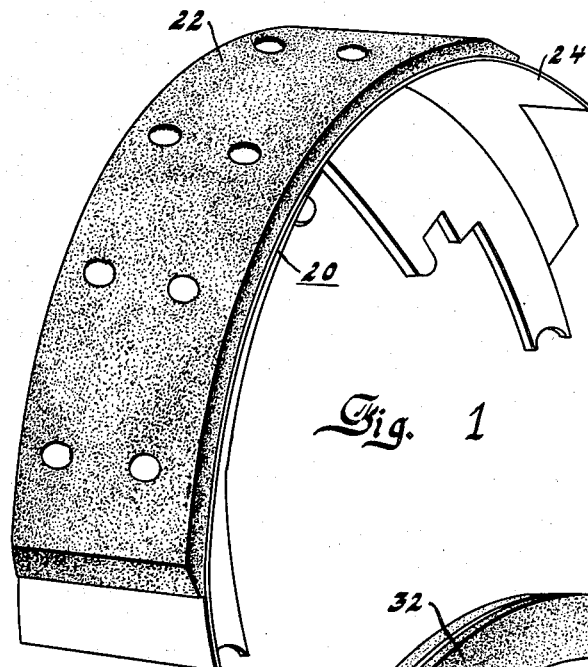
Figure 1 is a view in perspective of a typical brake band.

Modern automotive developments have imposed extreme operating conditions on the conventional type of clutches and brakes. The friction surfaces of conventional clutches and brakes are usually composed of molded nonmetallic material such as asbestos, cotton linters and the like bonded together with a synthetic resin such as a phenol-formaldehyde resin, the mixture may also include friction fortifying materials. This mixture of ingredients is molded into a brake band or disc surface which may be bonded or riveted to a metal support. While these friction elements and facings are satisfactory under normal driving conditions, it has been found that repeated stops from high speeds causes a tremendous overheating and eventual breakdown of the materials used in the brakes. In most cases, nonmetallic brake materials are not useful at temperatures above 750° F. and such temperatures are frequently exceeded in repeated high speed stops under extreme conditions.

Since the trend in automotive design is toward heavier and/or higher powered vehicles, it is apparent that the friction materials used in the brake and clutch surfaces must be improved in order to keep up with the development of the industry.

It has been found that metallic friction materials offer an interesting field of development. However, most metallic friction materials, while highly satisfactory, for example, in wet clutch applications, are not useful for brakes since they tend to squeak and grab in the dry condition. Furthermore, due to the abrasion of the materials in the dry condition, much of the friction facing is abraded from the friction surfaces which, in turn, self-aggravates the wear conditions. Furthermore, the noisiness of these materials has made them unsuitable in the past for passenger vehicles.

There are, however, many advantages in the use of metallic friction materials, some of the more important being ability to withstand high temperature conditions, ability to withstand higher engaging pressures and, in most cases, longer wearing characteristics.

We have developed a friction material which overcomes these past disadvantages of metallic friction materials when used in the dry state and which has maintained all of the advantages of metallic facing materials. We have found that our friction material, when used in conjunction with a disc or band type brake, will outlast nonmetallic friction materials many times, and will not be deleteriously affected at the high temperatures reached during repeated high speed stops. In fact, wear tests show that the present friction material will outwear several sets of conventional nonmetallic frictional material under identical operating conditions. Furthermore, the metallic friction material does not exhibit the fade-out of frictional qualities normally present in nonmetallic materials when excessive temperatures are encountered. Under actual road conditions, the present friction material operates smoothly and silently throughout extended use. In fact, the facing material operated well under tests comprising ten consecutive stops from a maximum speed of one hundred miles per hour, a condition which could not be duplicated with nonmetallic linings which failed completely after three to four of such stops.

Our new friction material is a sintered ferrous material having varying degrees of porosity and made from a mixture consisting essentially of iron powder, graphite and molybdenum disulfide, to this basic mixture may be added small quantities of sulfur and ceramic materials such as calcined mullite together with copper and lead for modifying the action of the friction material. The friction material is preferably bonded to a strong metal support through which it may be suitably secure to the brake or clutch mechanism in which it is to be subsequently used. Due to the presence of a large quantity of graphite, the material does not have a high degree of flexibility and is not readily bendable and, therefore, the strong metal support such as a steel backing is generally preferred.

Specifically, the material contains graphite, in quantities of from 20% to 25% by weight, together with molybdenum disulfide in quantities of from 2% to 6% by weight with substantially all the remainder being iron. The material is made by mixing the ingredients in finely divided form wherein, for example, the iron powder ranges between 150 and 325 mesh. This mixture is then briquetted to the desired shape under briquetting pressures ranging from 40,000 to 100,000 pounds per square inch, preferably at 70,000 pounds per square inch. The briquettes are next sintered for about 45 minutes at a temperature ranging between 1850° F. and 2050° F. under non-oxidizing conditions, for example, in dehydrated, incompletely burned natural gas, cracked ammonia or hydrogen. The resulting material presents a highly desirable friction material that will withstand high temperatures, maintain its frictional qualities over a wide range of temperatures, and which is long wearing and quiet.

In most cases, as previously stated, it is desirable to bond the material to a strong backing member, and this is accomplished by placing the briquettes upon supporting members of steel that have preferably been flash-coated with copper. A number of these "sandwiches" are stacked on top of one another with suitable spacers therebetween and the bonding is accomplished with the stack under pressure. A procedure of this character is fully disclosed in Wellman Patent 2,178,527 and is well known in the art. It is preferable to accomplish the sintering and bonding in a single operation although it is also possible to first sinter and then bond. It this case, the briquettes are sintered between sheets of graphitic material or metal having a nonadhering refractory coating thereover.

Another modification of the process contemplates a presinter of the briquetted powder at a temperature in the order of 1600° F. to 1950° F. for a period of 30 to 45 minutes. This partially sinters the briquette and makes it easier to handle. The presintered briquette is then assembled with the backing member and is bonded in the usual manner at about 1750° F. for 30 minutes. These conditions may vary, for example, the bonding temperature may be between 1750° F. and 2100° F. while the time may be between 20 minutes and 45 minutes varying inversely as the temperature. During the bonding step, the porous part is completely sintered. These variations in operating conditions may vary widely and are not critical so long as a good sinter and bond is obtained.

A preferred embodiment of the invention comprises the following formulation:

*Example 1*

22% Acheson #38 graphite
4% molybdenum disulfide, 100 mesh
74% 250 mesh reduced oxide iron powder A mixture of this material is briquetted at 80,000 pounds per square inch and is sintered on a steel supporting member of the desired configuration which has a flash copper plate thereon for a period of about 45 minutes at 2050° F. under pressure whereupon the material forms a strong sintered layer coextensively bonded to the supporting member. The friction and wear characteristics of this material may be modified by small additions of sulfur and ceramic materials such as mullite, clays, etc. In this case, the sulfur is preferably combined with the iron or may be an impurity therein and may range up to 1% by weight of the total mix. This addition appears to improve wear. The ceramic material, such as mullite, may range up to .75% by weight of the total mix. This addition acts as a friction modifying material and generally raises the coefficient of friction slightly. In any case, these additions are optional and should not exceed a total of 2% by weight of the element. It is understood that, in many cases, the effects of sulfur and ceramics can be attained without adding any material to the mix. In these cases, reduced oxide iron powder may be chosen which contains sulfur and insoluble ceramic material within the ranges noted as impurities therein.

Similarly, small additions of lead and/or copper may be added to modify friction characteristics as is well known in the art. For example, copper up to 5% by weight and/or lead up to 5% by weight may be added. These modifications prove useful under certain conditions. Our invention, however, is directed specifically to the basic formulation of a high percentage of graphite (20% to 25%) with molybdenum disulfide in controlled amounts wherein the remainder of the element consists essentially of iron with or without the modifying ingredients set forth herein.

Some specific examples of other mixes which are satisfactory are as follows wherein all percentages are expressed by weight:

*Example 2*

20% Acheson graphite
3% 150 mesh copper powder
5% 100 mesh lead powder
5% 100 mesh molybdenum disulfide
.75% calcined mullite
66.25% 100 mesh reduced iron oxide powder containing combined sulfur therein equal to 1% of the iron This mixture of powdered materials is briquetted at 70,000 pounds per square inch and may be sintered on a steel supporting member which has been flash-copper plated for a period of forty-five minutes at a temperature of 2050° F. in a nonoxidizing atmosphere under pressure. The powdered material forms a strong, sintered layer coextensively bonded to the supporting layer.

*Example 3*

22% Acheson graphite
4% 100 mesh molybdenum disulfide
74% 250 mesh reduced iron oxide powder containing in combined form sulfur together with insoluble ceramic material in quantities equal to about 1% and .75% respectively of the total mix The mixture of these powdered materials may be prepared and sintered as in Example 2.

*Example 4*

20% Acheson graphite
2.5% 200 mesh copper powder
4.5% 100 mesh lead powder
4% 100 mesh molybdenum disulfide
.75% sulfur
.65% calcined mullite
Remainder 100 mesh reduced iron oxide powder The same procedure for forming the material and sintering the same as in Example 2 may be followed.

*Example 5*

21% Acheson graphite
4% 100 mesh lead powder
5% 100 mesh molybdenum disulfide
Remainder 250 mesh reduced iron oxide powder containing combined sulfur equal to about 1% of the total mix.

A mixture of this material may be formed and sintered as in Example 2.

Figure 2:
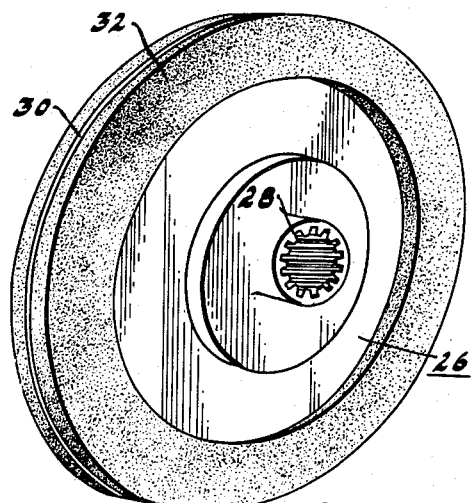
Figure 2 is a view in perspective of a clutch disc.

In the drawing, several forms of the friction member described in this disclosure are shown. For example, in Figure 1, a conventional type of brake band 20 is shown which has a ferrous friction surface 22 and a metal supporting back 24. This band may be made as herein described by placing preformed friction layers 22 upon the preformed supporting members 24 and stacking the sandwiches under pressure in a suitable furnace for sintering. Figure 2 shows one type of clutch plate at 26 which includes a splined hub 28, a steel disc 30 and friction surfaces 32 bonded thereto. The friction surface 32 may be provided at both sides of the clutch (as shown) if desired.

Figure 3:
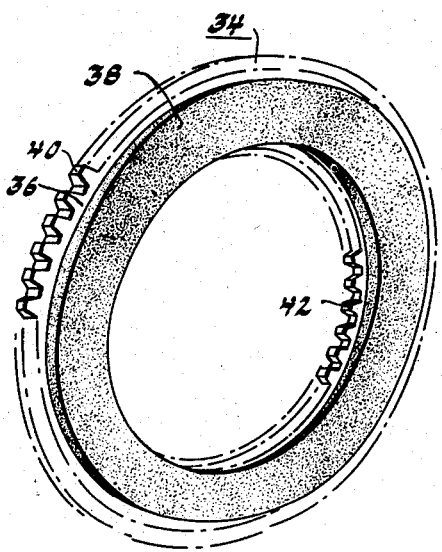
Figure 3 is a view in perspective of a clutch or brake disc for use in a clutch or brake pack.

Figure 3 shows still another form of clutch or brake at 34. In this form, the steel disc 36 supports a friction surface 38 at one or both sides thereof and the disc may be splined as at 40 on the outer periphery or as at 42 at the inner periphery thereof. This type of plate is generally used in a pack wherein alternate plates are splined at the inner and outer periphery respectively. These plates may be used in disc brakes, for example, as disclosed in Lambert Patent 2,405,219 which shows one type of automotive disc brake, or multiple plate clutches as disclosed in Almen and Carnegie application S.N. 392,596, now Patent 2,733,797, assigned to the assignee of the present invention.

The three curves in Figure 4 show consecutive stops at one minute intervals at 50, 60 and 70 miles per hour with a commercial molded nonmetallic lining wherein the rate of deceleration is maintained at fifteen feet per second per second. The "fade" characteristics of the lining are indicated by the increasing hydraulic pressures required to maintain constant deceleration. Thus, at 50 miles per hour, the pressure required to maintain this deceleration varied from 490 pounds per square inch for the first stop to 855 pounds per square inch for the tenth stop. At 60 miles per hour, these figures were 560 pounds per square inch for the first stop and 1145 pounds per square inch for the tenth. At 70 miles per hour, the lining failed on the sixth stop.

By way of comparison, Figure 5 shows the same curves for our improved metallic lining as described herein and made in accordance with Example 1. It will be seen that the pressures required for the first stop are consistently lower and that the pressures required for subsequent stops are substantially constant. No failures were noted. All tests were made on identical equipment and with identical braking elements with the exception of the brake material per se. In this instance, the commercial lining tested was of a 40.8 square inch area while the ferrous lining was only 36 square inches in area.

The present invention, therefore, is directed basically to a porous ferrous friction element including a relatively high percentage of graphite together with significant quantities of molybdenum disulfide wherein said element may or may not contain small additions of wear and friction modifying ingredients. The friction element may also include an impregnant within the pores thereof if it is desired for sealing the pores against the ingress of the atmosphere where the material is to be stored over appreciable periods of time. This material is preferably a heat resistant resin which can be impregnated into the material and which does not markedly influence the frictional characteristics of the material. Therefore, it is understood that impregnants may be used without departing from the concept of the invention.

Throughout this specification, the term ceramic material is used together with mullite as one embodiment thereof. It is to be understood that this example is illustrative only and that clays, silica magnesium oxide, mica or any of the other refractory ceramic materials may be used with varying useful results.

While the forms of embodiment of the present invention as herein disclosed constitute preferred forms, it is to be understood that other forms might be adopted.

What is claimed is as follows:

1. A new article of manufacture, comprising, a friction facing consisting essentially of a compacted and sintered body formed from a powdered mixture of 20% to 25% graphite, 2% to 6% molybdenum disulfide and the balance iron.

2. A new article of manufacture, comprising, a friction facing consisting essentially of a compacted and sintered body formed from a powdered mixture of 22% graphite, 4% molybdenum disulfide and the balance iron.

3. The article as claimed in claim 1 wherein the friction facing is coextensively bonded to a metal backing member.

4. The article as claimed in claim 2 wherein the friction facing is coextensively bonded to a metal backing member.

5. A new article of manufacture, comprising, a friction facing consisting essentially of a compacted and sintered body formed from a powdered mixture of 20% to 25% graphite, 2% to 6% molybdenum disulfide, and the balance iron wherein the iron includes as impurities insoluble ceramic material up to .75% and sulfur up to 1% by weight of the powdered mixture.

6. The article claimed in claim 5 including lead and copper in quantities less than 5% by weight each.

7. A new article of manufacture, comprising, a friction facing consisting of a sintered compact of graphite 20% to 25%, molybdenum disulfide 2% to 6%, sulfur up to 1%, mullite up to .75%, copper up to 5%, lead up to 5% and the balance iron, said quantities being expressed by weight.

8. A new article of manufacture, comprising, a friction facing consisting of a sintered compact of graphite 20%, copper 3%, lead 5%, molybdenum disulfide 5%, calcined mullite .75%, sulfur .67% and the balance iron, said quantities being expressed by weight.

References Cited in the file of this patent
UNITED STATES PATENTS

| | | |
|---|---|---|
| 2,239,134 | Wellman | Apr. 22, 1941 |
| 2,367,406 | Kott | Jan. 16, 1945 |
| 2,408,430 | Lowey et al. | Oct. 1, 1946 |
| 2,731,360 | Love | Jan. 17, 1956 |
| 2,784,105 | Stedman et al. | Mar. 5, 1956 |
| 2,848,795 | Lowey | Aug. 26, 1956 |